United States Patent Office 3,207,711
Patented Sept. 21, 1965

3,207,711
LIGHT WEIGHT BUTYL RUBBER-POLYETHYLENE CLOSED-CELL SPONGE
Lawrence Spenadel, Fanwood, Herman Bieber, Kenilworth, and David M. Coddington, Dunellen, N.J., assignors to Esso Research and Engineering Company, a corporation of Delaware
No Drawing. Filed June 9, 1961, Ser. No. 115,943
1 Claim. (Cl. 260—2.5)

This invention relates to a low-density, closed-cell sponge made by compounding butyl rubber with polyethylene or like $C_2$–$C_3$ alkene polymer and processing to obtain a suitably uniform cell structure, high tensile strength, compression resistance, increased chemical resistance, and increased impermeability. The sponge is also made to meet stringent requirements of low water absorption and a low content of non-rubber materials.

A butyl rubber-polyethylene sponge of high tensile strength, without filler loading has a high acid resistance, high elasticity and low density. This kind of sponge has a number of interesting uses, e.g., for making fabrics, cushioning, lining, protective padding, seals, gaskets, shock absorbers, and insulators. The light weight and chemical resistance makes it suitable for use in light weight articles, in aircraft parts, in missile hardware parts, and as mechanical goods that are required to protect against leakage of gas and corrosive chemicals.

In accordance with the present invention, a light-weight sponge having the desired properties is made by compounding 65 to 75 parts by weight of butyl rubber with 25 to 35 parts by weight of polyethylene, with activating agents, such as zinc oxide and stearic acid and with sulfur while such a mixture is milled and heated to a suitable maximum temperature in the range of about 230° to 340° F. in a short period, followed by cooling, addition of curvature accelerators and blowing agents, then by precuring, blowing and final curing of the resulting blend in a blowing mold.

Although compounding of butyl rubber for making sponge has some resemblances to conventional compounding of natural rubber for making a sponge, the processing of the butyl rubber-polyethylene mixture has some important differences.

For successful sponge, crude natural rubber has to be premasticated for a long period (about 1 hour) or plasticized and masticated. For processing, natural and straight butyl rubber have required high amounts of softeners or plasticizers. For increasing tensile strength, natural rubber and straight butyl rubber require loading with solid fillers, which tend to lower resilience, are detrimental for low compression set (ability to return to original thickness after compression), and decrease chemical resistance. In contrast thereto, butyl rubber-polyethylene processing can be carried out without long mastication, large proportions of softeners or plasticizer, and without the loading which is adverse to resilience, chemical resistance, and gas impermeability.

Butyl rubber is the name well-known in the synthetic rubber art for a rubbery copolymer of an isoolefin, e.g. isobutylene and a diolefin, e.g. isoprene. There copolymers are mostly formed by copolymerizing 90 to 99.5 wt. percent isoolefin with 0.5 to 10 wt. percent diolefin. The manufacture and characteristics of butyl rubber used in the present invention are described in U.S. Patent 2,356,128 and in chapter 24 of "Synthetic Rubber," edited by Whitby, John Wiley and Sons Inc. (1954). These copolymers may have a viscosity average molecular weight in the range of 100,000 to 1,500,000 and higher. They may have a Wijs iodine number of about 1 to 50.

The polyethylene ingredient may be obtained by a low pressure or high pressure process. Polypropylene may be obtained by a low pressure process. In the low pressure process a titanium tetrachloride-aluminum triethyl type catalyst is used. These $C_2$–$C_3$ polyalkenes are branched or linear and may be copolymers. They preferably should have a molecular weight in the range of about 5,000 to 75,000 and melting points in the range of 230 to 340° F., when admixed with the butyl rubber for satisfactory sponge preparation. At these temperatures the blending is quickly achieved on the mill without scorching the gum mixture.

While the gum mixture of butyl rubber and polyethylene is formed and heated, known suitable ingredients are admixed in suitable small amounts, e.g. about 1 to 5% zinc oxide, about 1 to 10% stearic acid, or similar accelerator activators, and about 1 to 2% sulfur. By eliminating addition of fillers, which give difficulties of dispersion, the zinc oxide, stearic acid, and sulfur are quickly distributed through the gum blend in a few minutes and no substantial curing or vulcanization occurs in the absence of accelerators as the temperature of the blend is raised to a maximum temperature in the range of 300 to 340° F. The blend is then cooled.

Curvatives, including vulcanizing accelerator, and blowing agents are added to the cooled gum blend containing the zinc oxide, stearic acid, and sulfur at about 180° to 230° F. with further milling to form a plastic mass with marginal amount of vulcanization or curing on account of the low temperature and short time of the low temperature milling.

The plastic mass containing the ingredients for blowing and curing is placed in a mold to precure for partial vulcanization.

Butyl rubber can be vulcanized with quinoid curing agents, such as para-quinone dioxime (GMF) in the presence of an oxidizing agent, or para-dinitrosobenzene. To avoid the use of metal oxides, benzothiazoyl disulfide may be used as an oxidizing agent with paraquinone dioxime.

Accelerating agents used for the sulfur cure are tetramethylthiuram disulfide (TMTDS), tellurium diethyldithiocarbamate, zinc salt of mercaptobenzothiazole (ZnMBT) and methylbenzothiazole disulfide (MBTS).

The blowing agent is generally a material which decomposes at the curing temperatures (310° F. to 340° F.) to $N_2$-containing gas. The gas generated from the decomposition of the blowing agent causes formation of numerous cells in the compounded plastic-elastomer mix. Suitable blowing agents include heterocyclic dinitroso compounds, and organic hydrazines, e.g., dinitrosopentamethylenetetramine (Opex 40), azoisobutyric nitrile, and p,p'-oxybis(benzenesulfonyl hydrazide). An activator for the blowing agents, e.g. a urea complex (Aktone) may be added.

The vulcanization or curing is accomplished during the blowing in a mold. The plastic mass containing the curing ingredients and blowing agent is placed in the mold cavity which is partially filled by the plastic mass at the start. As the mass is heated in the mold, gas is generated in the mass which is expanded while curing takes place and the expanded mass fills the mold. The mold is then cooled and the shaped sponge is removed. About 15 to 30 minutes is the time used for blowing and final curing.

The gas generated is trapped in the pores or cells, distributed through the sponge, and the cells are separated from each other by a cell wall or membrane composed of the cured butyl rubber-polyethylene blend.

In compounding, 25 to 35 parts by weight of the polyethylene, or polyalkene, are admixed with 65 to 75 parts by weight of butyl rubber for desired sponge density and cell structure.

The following example shows in detail the formulation, control of conditions in processing and properties of the resulting butyl rubber-polyethylene sponges made without loading.

EXAMPLE

| Formulation | Parts Wt. | Banbury Cycle | | |
|---|---|---|---|---|
| | | Time, Mins. | Temp., °F. | Steps |
| Butyl | 70 | 0 | 230 | Charge butyl. |
| Polyethylene | 30 | 1 | 230 | Add polyethylene. |
| Zinc Oxide | 3.5 | 3 | 230-320 | Add zinc oxide. |
| Stearic Acid | 1.0 | 4-5 | 300-320 | Add acid, ½ then ½. |
| Sulfur | 1.5 | 8 | 320-340 | Add sulfur. |
| | | | <230 | Cool. |
| GMF | 1.5 | 10 | <230 | Add GMF. |
| MBTS | 2.8 | 11 | <230 | Add MBTS. |
| Aktone | 4 | 12 | <230 | Add Aktone. |
| Opex | 15 | 13 | <210 | Add Opex. |
| | | 14 | <200 | Dump and blend on cool mill. |

Pre-cure

Place blend in a mold, closed press, for 3 to 5 minutes at about 300° to 310° F. to develop a hard skin over surface.

Cure

Cure in a mold at about 310° to 340° F. for about 15 to 30 minutes. Blowing takes place.

PHYSICAL PROPERTIES (ASTM D–1056–58T)

Water absorption, wt. percent _____ <3
Blow ratio, percent _____ 325
Specific gravity (unexpanded) _____ 1.01
Tensile strength, p.s.i. _____ 150
Sponge density, g./cc. _____ 0.45
Compression set, percent _____ 42

A pure butyl rubber sponge, without added polyethylene, and without loading by fillers or reinforcing solids, made in a similar manner has a tensile strength of 10 to 15 p.s.i., 20% compression set. It has mostly interconnected open cells and a water absorption of 400 wt. percent. Conventional filler loading butyl rubber sponge results in a decrease in resilience and lowered acid resistance.

A natural rubber sponge made in a conventional manner but without loading has a tensile strength of only 10 p.s.i. Even with added polyalkene (e.g. 30 parts to 100 parts natural rubber) the tensile strength of such a sponge is low.

In making the low density butyl rubber-polyethylene sponge (specific gravities of about 0.4 to 0.5 gram per cubic centimeter) without loading, the vulcanizing, activating and accelerating agents, or curatives of known types and in conventional weight proportions can be used. Thus, in general, to 100 parts of gum mixture (65 to 75 wt. percent butyl rubber–25 to 35 wt. percent polyethylene) are added about 5 to 10 parts of the vulcanizing or curing agents and about 10 to 20 parts of blowing agent (including activator if needed).

The unloaded sponge products of the present invention are distinct from absorbent sponge products loaded with inorganic solid materials as described in application Ser. No. 820,826, filed June 16, 1959, by H. Bieber et al.

In the light of the present teaching, there are obvious modifications that can be made without departing from the spirit and scope of the invention as defined in the appended claim.

What is claimed is:

A process for making a closed-cell rubbery sponge of increased tensile strength, chemical resistance, and impermeability, which comprises compounding 65 to 75 parts by weight of butyl rubber with 25 to 35 parts by weight of a $C_2$ to $C_3$ alkene polymer having a melting point in the range of 230° to 340° F. to form a gum blend, said butyl rubber being a copolymer of 90 to 99.5 wt. percent of isobutylene with 0.5 to 10 wt. percent isoprene, admixing with said gum blend 5 to 10 parts by weight of the vulcanizing agents, zinc oxide, stearic acid and sulfur, as the resulting mixture is milled and heated at a temperature in the range of 230° to 340° F., cooling the resulting mixture to below 230° F., adding to the cooled mixture a small amount of a quinoid curing accelerating agent and 10 to 20 parts by weight of an organic blowing agent which decomposes to form nitrogen gas at temperatures in the range of 310° to 340° F. while maintaining the resulting mixture at a temperature in the range of about 180° to 230° F. to form a plastic mass having said agents dispersed therein but kept substantially unloaded by other materials, partially precuring said plastic mass for about 3 to 5 minutes at about 300° to 310° F. to develop a hard skin surface on said plastic mass, thereafter simultaneously blowing and curing said mass so that it is fully cured as it is expanded into a shaped sponge at about 310° to 340° F. for about 15 to 30 minutes, then cooling the resulting sponge.

References Cited by the Examiner

UNITED STATES PATENTS 3,010,916   11/61   Pooley _____ 260—2.5

FOREIGN PATENTS 850,965   10/60   Great Britain.

MURRAY TILLMAN, *Primary Examiner.*

LEON J. BERCOVITZ, *Examiner.*